United States Patent [19]

Theurer

[11] 4,282,663
[45] Aug. 11, 1981

[54] TRACK WORKING MACHINE WITH A BALLAST PLOW ARRANGEMENT

[75] Inventor: Josef Theurer, Vienna, Austria

[73] Assignee: Franz Plasser Bahnbaumaschinen-Industriegesellschaft m.b.H., Vienna, Austria

[21] Appl. No.: 104,000

[22] Filed: Dec. 17, 1979

[30] Foreign Application Priority Data

Jan. 16, 1979 [AT] Austria ................................. 324/79

[51] Int. Cl.³ ............................................. E01B 27/04
[52] U.S. Cl. ............................................ 37/104; 104/6
[58] Field of Search ................. 104/6, 7; 37/104, 105

[56] References Cited

U.S. PATENT DOCUMENTS

| | | | |
|---|---|---|---|
| 3,457,660 | 7/1969 | Speno | 37/105 |
| 3,651,587 | 3/1972 | Plasser et al. | 37/105 |
| 3,877,160 | 4/1975 | Plasser et al. | 37/104 |
| 4,165,694 | 8/1979 | Thevrer | 104/7 B |

FOREIGN PATENT DOCUMENTS 1248082 8/1967 Fed. Rep. of Germany ............ 37/104
488860 5/1970 Switzerland ............................... 37/104

*Primary Examiner*—Richard A. Bertsch
*Attorney, Agent, or Firm*—Kurt Kelman

[57] ABSTRACT

A ballast plow arrangement comprises two plows arranged on a frame of a track working machine for independent vertical adjustment. Each plow is constituted by an integral plow plate bridging a respective track rail and extending transversely to the central axis of the machine frame into the range thereof, the plow plates having adjacent ends in the range of the central axis and defining an acute angle with each other to form a plow arrangement extending over substantially the entire width of the track. A ballast regulating guide plate is mounted on each plow plate end for selective adjustment between a rest position and an operating position wherein the ballast regulating guide plate projects beyond the central axis.

8 Claims, 11 Drawing Figures

U.S. Patent  Aug. 11, 1981  Sheet 1 of 2  4,282,663
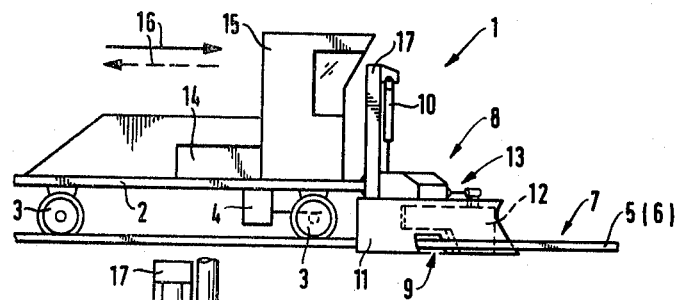
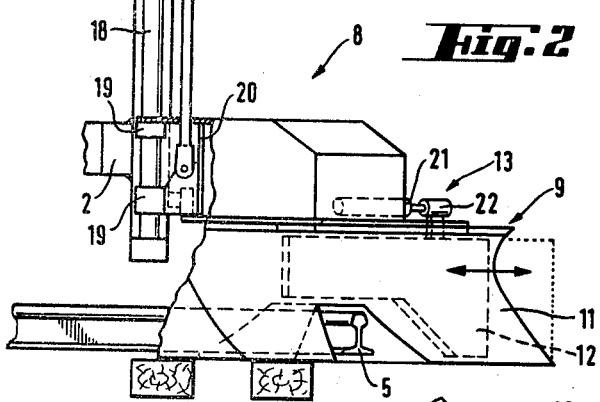
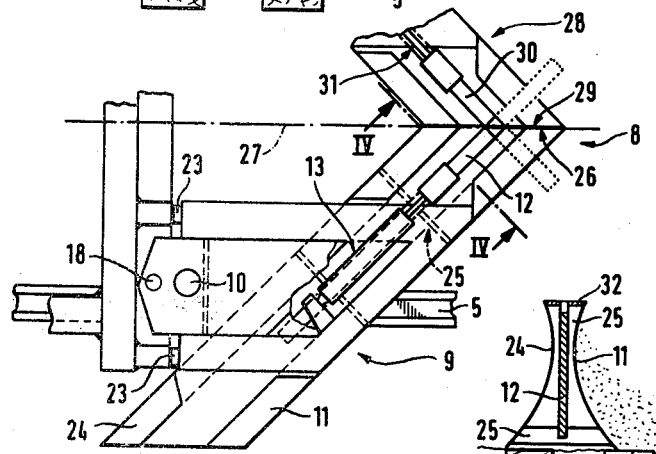

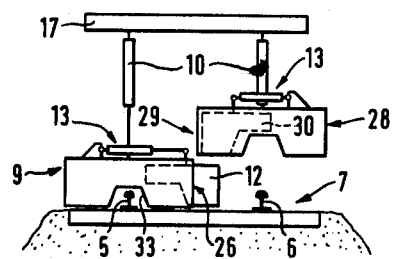
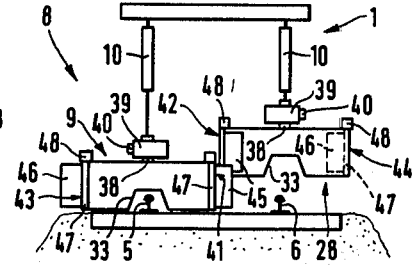
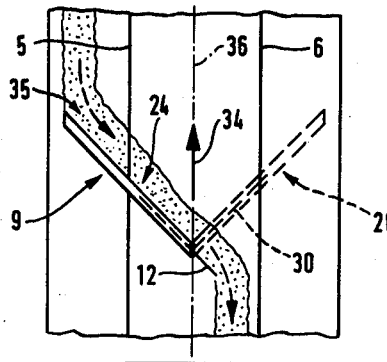
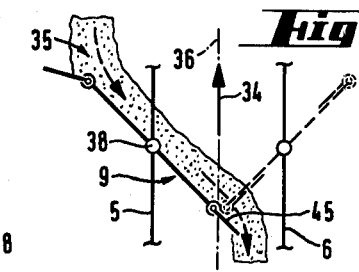
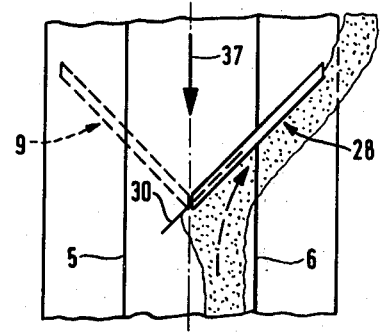
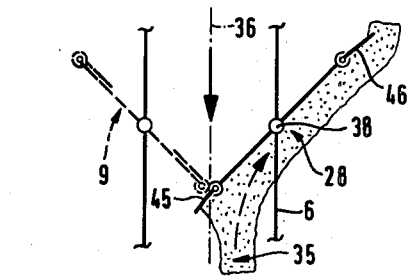

TRACK WORKING MACHINE WITH A BALLAST PLOW ARRANGEMENT

The present invention relates to improvements in a track working machine comprising a ballast plow arrangement for distributing and profiling the ballast of a railroad track including two rails, the machine having a frame with a central axis extending between and substantially parallel to the rails.

Accepted German patent application No. 1,248,082, published Aug. 24, 1967, discloses a ballast regulator wherein the ballast plow arrangement comprises two plows arranged on the machine frame for independent vertical adjustment. Each plow is constituted by an integral plow plate bridging a respective one of the track rails and extending transversely to the central axis into the range thereof. The plow plates have adjacent ends in the range of the central axis and define an acute angle with each other to form a plow arrangement extending over substantially the entire width of the track. With this ballast regulator, the ballast transport from the center range of the track between the rails is not always fully assure, particularly when the two independently adjustable plow plates are used alternately and in succession.

U.S. Pat. No. 3,651,587, dated Mar. 28, 1972, also discloses a ballast regulator with two vertically independently adjustable ballast plows. Each plow comprises an elongated channeled bottom covering a respective track rail and supporting a transversely extending plow plate. The plow plate has ballast guide plates hinged to each end thereof for pivoting about a vertical axis in relation to the plow plate. The guide plates are so arranged and dimensioned that they may overlap. In addition, the plows may also be longitudinally independently adjustable in the direction of the track elongation. This manifold adjustability of the plows and ballast regulating guide plates enables the plow arrangement to be used for a great variety of ballast regulating treatment in a single operation to meet prevalent ballast bed conditions. However, the great number of drives required to control these manifold adjustments as well as the required use of the two central ballast regulating guide plates to obtain a plow arrangement extending continuously over the ballast area between the two track rails make for a plow arrangement which is not sturdy enough to meet all ballast bed conditions, particularly where massive amounts of ballast must be moved. In addition, the many components of the plow arrangement require considerable maintenance further reducing the usefulness of the machine for some operations.

Similar types of ballast regulators suffering substantially from the same disadvantages are disclosed in U.S. Pat. No. 3,491,467 dated Jan. 27, 1970, and Swiss Pat. No. 488,860, published May 29, 1970.

It is the primary object of this invention to provide a ballast regulator of the first-indicated type and which has a sturdy plow arrangement enabling the ballast in the central area of the ballast bed between the two track rails to be transported and distributed without difficulty even where large amounts of ballast are involved and if the two plow plates are used alternately and successively.

In a track working machine of this type, the above and other objects are accomplished according to the invention with a ballast regulating guide plate mounted on each plow plate end for selective adjustment between a rest position and an operating position wherein the ballast regulating guide plate projects beyond the central axis.

The use and specific arrangement of the two integral plow plates bridging over the track rails enables the plow arrangement to be made very massive and rigid so that it can exert considerable pushing forces on the ballast, capable of moving large amounts of ballast. At the same time, this plow arrangement is able to handle a great variety of ballast bed conditions, the additional ballast regulating guide plates making it possible in an unexpectedly simple manner to produce an overlap of the operating ranges of each plow plate when they are used alternately and successively. The central ballast bed area between the two track rails can be worked without difficulty and the ballast can be removed or redistributed in this area without residual ballast remaining unregulated. This advantage becomes particularly significant when ballast must be displaced from one side of the track to the other track shoulder, which often is the case in ballast regulation work. In this case, the ballast is moved by the plow plate from one shoulder to the center of the ballast bed and, in the same operation, is transported beyond the central axis of the track by the ballast regulating guide plate adjusted to its operating position. After one work stage in a track section has been completed and the operating direction of the machine is reversed, the guide plate on the other plow plate is also adjusted from the rest into a operating position, the two plow ends now overlapping at the center to move all the ballast therefrom towards the shoulders of the track.

The above and other objects, advantages and features of the present invention will become more apparent from the following detailed description of certain now preferred embodiments thereof, taken in conjunction with the somewhat schematic drawing wherein FIG. 1 is a side elevational view of a track working machine according to this invention;

FIG. 2 is an enlarged side elevation showing the plow arrangement on the machine of FIG. 1;

FIG. 3 is a top view of one of the two identical halves of the plow arrangement of FIG. 2;

FIG. 4 is a front elevational view of the plow arrangement, along line IV-IV of FIG. 3;

FIG. 5 is a front elevational view of the plow arrangement of FIG. 1 in a schematic illustration;

FIGS. 6 and 7 are top views of this plow arrangement in two different operating positions;

FIG. 8 is a view similar to that of FIG. 5, showing a different embodiment of the plow arrangement;

FIGS. 9 to 11 are top views of the plow arrangement of FIG. 8 in different operating positions.

Referring now to the drawing and first to FIG. 1, there is shown track working machine 1 having frame 2 which is supported by undercarriages 3, 3, the wheels of one of which are driven by motor 4, on railroad track 7 including rails 5, 6. The rails are fastened to ties resting on ballast (not shown) and ballast plow arrangement 8 is mounted on a portion of machine frame 2 projecting beyond undercarriage 3 whose wheels are driven for distributing and profiling the ballast.

Plow arrangement 8 comprises two like plows 9 and 28 (see FIG. 5) of which only plow 9 is visible in the side elevation of FIG. 1, the plows being arranged on machine frame 2 for independent vertical adjustment by drives 10, 10 which mount the plows on the machine frame for vertical movement relative to the machine frame. Each plow is constituted by integral plow plate 11 bridging a respective track 5, 6 and extending transversely to central axis 27 (see FIG. 3) of the machine frame into the range thereof. The plow plates have adjacent ends 26, 29 in the range of central axis 27 and define an acute angle with each other to form a plow arrangement extending over substantially the entire width of the track (see FIGS. 6 and 7).

In accordance with the invention, ballast regulating guide plate 12, 30 (see FIG. 5) is mounted on each plow plate 11 of which only guide plate 12 is seen in FIG. 1, each ballast regulating guide plate being arranged for selective adjustment between a retracted rest position and an operating position wherein the ballast regulating guide plate projects beyond central axis 27 to extend the plow plate beyond the apex of the plow arrangement. In the embodiment shown in FIGS. 2 and 3, each integral plow plate comprises longitudinally extending guide 25 and the ballast regulating guide plate on each plow plate is telescopingly glidably arranged in the guide. Adjustment drive 13 moves the ballast regulating guide plate in the guide for selective adjustment between the rest and operating positions of the guide plate. As best shown in FIG. 5, the illustrated adjustment drive is linked to the integral plow plate and to the ballast regulating guide plate, respectively, and is a hydraulic cylinder-piston drive 21.

The telescoping guiding movement of the ballast regulating guide plate with respect to the plow plate permits the guide plate to be strongly supported while being selectively positioned for an adjustment of the effective operating length of the plow. Furthermore, the adjustment drive need not be too powerful because it is barely subject to any reaction forces from the moving masses of ballast.

As shown in FIG. 1, machine frame 2 supports operator's cab 15 from which all operations may be centrally controlled power plant 14 being mounted on the machine frame to supply power to vertical adjustment drives 10, selective plow adjustment drives 13 and motor 4 for moving the machine along the track in either operating direction indicated by arrows 16. Plow arrangement 8 is so constructed that it may be used in either operation direction.

The mounting of plow arrangement 8 and structural details thereof are more clearly illustrated in FIGS. 2 and 3. As shown, carrier frame 17 is affixed to an overhanging end of machine frame 2 and includes vertical guide column 18 on which plow arrangement 8 is vertically glidably mounted by means of gliding bearings 19, 19. Vertical drive 10 comprises a cylinder and piston respectively pivotally linked to carrier frame 17 and plow arrangement frame 20. This frame carries the two plows and also supports cylinder-piston drive 21, coupling 22 linking the drive to the ballast regulating guide plate.

As clearly shown in FIGS. 2 and 5, ballast regulating guide plate 12, 30 is recessed, the portion of the plate adjacent the central axis being higher than the portion extending towards an associated one of rails 5, 6. In this manner, when the ballast regulating guide plate is in its retracted rest position shown in FIG. 2, it can bridge over the associated rail, conforming to the cut-out in plow plate 11 which accommodates the rail. The width of cut-out 33 in the plow plate is so dimensioned that plow arrangement 8 may also be used in track curves while the rail passes freely through the cut-out.

FIG. 3 shows that plow arrangement 8 is supported on vertical struts of carrier frame 17 by gliding elements 23, 23 at respective sides of guide column 18 and vertical drive 10 so that a major portion of the reaction forces coming from the ballast during operation of the plow arrangement is transmitted directly to the carrier frame and the guide column remains relatively free of loads derived from these forces.

To enable the plow arrangement to be used with equal effectiveness in either operating direction indicated by arrows 16, each integral plow plate 11 is associated with a like plow plate 24, the twin plates being mounted in a mirror-symmetrical arrangement to form therebetween housing 32 for the ballast regulating guide plate. The illustrated twin plates are concave plowshares facing away from each other, as shown in FIG. 4, guide 25 extending in the housing formed by the plowshares for guide plate 12. The guide is defined by slots in transverse webs which interconnect and stiffen twin plates 11 and 24. This produces a rigid and massive ballast plow adapted for handling large amounts of ballast.

Upon operation of drive 13, the ballast regulating guide plate may be moved steplessly from the retracted rest position shown in full lines in FIG. 3 to the operating position shown in dotted lines.

The twin-plate arrangement enables the plow to be used in opposite operating directions while so housing the additional ballast regulating guide plate that it will not interfere with the desired ballast flow.

As shown in FIG. 5, plow 28 is identical to plow 9 illustrated in detail in FIGS. 2-4. In this figure, plow 9 is lowered into the operating position and its ballast regulating guide plate 12 has been extended into the operating position to remove ballast from the tops of the track ties at one side of the track while plow 28 is raised and its ballast regulating guide plate 30 is in the retracted rest position, too.

As shown in FIG. 6, when machine 1 moves forwardly in the direction of arrow 34, ballast 35 flows from the left shoulder adjacent track rail 5 over the rail into the area between center axis 36 and track rail 6. Projecting ballast regulating guide plate 12 assures the transport of the ballast beyond center axis 36 towards the other track rail.

FIG. 7 illustrates the subsequent working stage when the machine is moved in the direction of arrow 37, plow 9 is raised into its rest position and plow 28 is lowered into its operating position, with its ballast regulating guide plate 30 projecting beyond the center axis. In this way, all the ballast between track rails 5 and 6 will be fully removed to the other shoulder, only these two working stages being required for this transport of ballast from one shoulder to the other. The provision of the selectively adjustable ballast regulating guide plates on the robust, V-shaped plow arrangement thus not only makes it possible to move all the desired amount of ballast from one shoulder to the other in a single forwarded-and-reverse pass but also to clear the ballast between the two track rails by the exclusive use of twin plows 9 and 28 which are constituted by integral plow plates so as to produce a massive V-shaped plow arrangement. This is done simply by retracting ballast regulating guide plates 12 and 30 into their rest positions behind plow plate ends 26 and 29 so that these ends abut.

FIG. 8 illustrates another embodiment of plow arrangement 8, like reference numerals designating like parts functioning in a manner described hereinabove in connection with FIGS. 1 to 7. In this embodiment, ballast regulating guide plates 45 are mounted on each one of adjacent plow plate ends 41, 42 and additional ballast regulating guide plates 46 are mounted on each one of opposite plow plate ends 43, 44. A vertical axle 47 rotatably mounts each ballast regulating guide plate on the end of the integral plow plate on which it is mounted for selective adjustment between a rest position and an operating position. This arrangement is particularly useful when the ballast regulating guide plates are to be used while both plows are in an operating, ballast-engaging position to provide additional control for the ballast to be removed from the central area between the track rails to the shoulders.

In the embodiment of FIG. 8, each vertical drive 10 is connected to plow carrier 39 and a vertical axle 38 mounts each plow 9, 28 rotatably on its carrier for pivoting relative thereto in a direction transverse to center axis 36 of machine 1. Drives 40, which may be hydraulic motors or could be mechanical or electrical adjustment devices, are provides for pivoting the plows about the vertical axles. Like pivoting drives 48 are provides for selective adjustment of ballast regulating guide plates 45 and 46.

As will be seen in FIG. 8, vertical axle 38 rotatably mounting each plow plate 11 extends in the range of a vertical plane defined by a respective one of track rails 5, 6 intermediate the ends of each plow plate and a respective ballast regulating guide plates 45, 46 is mounted on each end 43, 44 of each plow plate. This arrangement enables the plow arrangement to be used for the complete movement of ballast towards and from the area of the ballast bed between the track rails, independent of the operating direction of the machine and of the direction in which the ballast is to be moved. The mounting of ballast regulating guide plates at both ends of each plow plate makes it possible to use each plow plate in any angular position.

In the illustrated embodiment, ballast regulating guide plates 45, 46 are pivoted to ends 43, 44 of the plow plates by vertical axles 47 for selective adjustment by drives 48.

FIG. 9 shows an operating position of the plow arrangement in which plow 9 has been lowered into engagement with the ballast (as illustrated in FIG. 8) and machine 1 is moved in the direction of arrow 34, with ballast regulating guide plates 45 and 46 extended into their operating position. This causes ballast 35 to flow from the left shoulder of the ballast bed into the area of the bed beyond center axis 36 towards track rail 6.

In FIG. 10, a plow arrangement position is shown which may be used when a large amount of ballast has been stored along the track. In this case, both plows 9 and 28 are lowered into engagement with the ballast and plow 28 is rotated about axle 38 until it assumes a position substantially parallel to that of plow 9. Upon moving machine 1 forwardly in the direction of arrow 34, the ballast from the left shoulder is moved beyond center axis 36 towards rail 6 while a portion of the ballast between track rails 5 and 6 is moved to the right shoulder next to rail 6.

FIG. 11 shows a plow arrangement position used after the machine has made the two passes illustrated in FIGS. 9 and 10 to move the ballast from the center area between track rails 5 and 6 to the right shoulder next to rail 6. In this position, plow 9 is raised by hydraulic motor 10 to the rest position (shown for plow 28 in FIG. 8) and plow 28, after having been raised and pivoted about axle 38 through an angle of 90°, is lowered again into ballast engaging position. Ballast regulating guide plate 45 is then extended into the operating position so that the ballast may be effectively moved towards the right shoulder.

What is claimed is:

1. A track working machine comprising a ballast plow arrangement for distributing and profiling the ballast of a railroad track including two rails, the machine having a frame with a central axis extending between and substantially parallel to the rails, the ballast plow arrangement comprising
   (a) two plows arranged on the machine frame for independent vertical adjustment, each of the plows being constituted by
      (1) an integral plow plate bridging a respective one of the track rails and extending transversely to the central axis into the range thereof, the plow plates having adjacent ends in the range of the central axis and defining an acute angle with each other to form a plow arrangement extending over substantially the entire width of the track, and
      (2) a ballast regulating guide plate mounted on each plow plate end for selective adjustment between a rest position wherein the ballast regulating guide plate is fully covered by the plow plate on which it is mounted, seen in the direction of machine elongation, and an operating position wherein the ballast regulating guide plate projects beyond the central axis and the plow plate on which it is mounted.

2. The track working machine of claim 1, wherein each integral plow plate comprises a longitudinally extending guide and the ballast regulating guide plate mounted on each plow plate is telescopingly glidably arranged in the guide, and further comprising an adjustment drive for moving the ballast regulating guide plate in the guide.

3. The track working machine of claim 2, wherein the adjustment drive is linked to the integral plow plate and to the ballast regulating guide plate, respectively.

4. The track working machine of claim 2 or 3, wherein the adjustment drive is a hydraulic cylinder-piston drive.

5. The track working machine of claim 1, further comprising a vertical axle rotatably mounting each ballast regulating guide plate on the end of the integral plow plate on which it is mounted.

6. The track working machine of claim 1, further comprising a like plow plate associated with each integral plow plate, the two plow plates being mounted in a mirror-symmetrical arrangement to form therebetween a housing for the ballast regulating guide plate.

7. The track working machine of claim 1, further comprising a vertical axle rotatably mounting each integral plow plate, the axle extending in the range of a vertical plane defined by a respective one of the track rails.

8. The track working machine of claim 7, wherein a respective one of the ballast regulating guide plates is mounted on each end of each plow plate.

* * * * *